United States Patent [19]
Olson et al.

[11] 3,715,477
[45] Feb. 6, 1973

[54] VIDEO SIGNAL NOISE-LIMITING APPARATUS

[75] Inventors: Charles Langdon Olson, Oaklyn; John Francis Monahan, Moorestown; Robert Adams Dischert, Burlington, all of N.J.

[73] Assignee: RCA Corporation

[22] Filed: March 11, 1971

[21] Appl. No.: 123,233

[52] U.S. Cl...........178/5.4 R, 178/DIG. 12, 328/167
[51] Int. Cl...........................H04n 9/02, H04n 5/14
[58] Field of Search.....178/5.4 R, 7.3 R, 7.5 R, 7.35, 178/7.55, DIG. 12; 325/65, 473, 474, 477; 328/165, 167

[56] References Cited

FOREIGN PATENTS OR APPLICATIONS 1,908,247 9/1970 Germany......................178/DIG. 12

OTHER PUBLICATIONS

Modern Dictionary of Electronisc, Allied Radio Corp. Graf. 3rd Printing 1970 page 87

*Primary Examiner*—Robert L. Richardson
*Attorney*—Eugene M. Whitacre

[57] ABSTRACT

The signal is separated into high and low frequency constituents by a filter, the high frequency signal constituent is cored to remove low amplitude excursions therefrom, and the cored high frequency signal constituent is combined with the low frequency signal constituent in suitable proportions to produce a resultant signal having an improved signal-to-noise ratio. In one form of the apparatus the video signal is the luminance component. In another form the noise-limiting is applied to each of a plurality of component color signals. A composite color television video signal is noise-limited by further forms of the apparatus.

13 Claims, 17 Drawing Figures

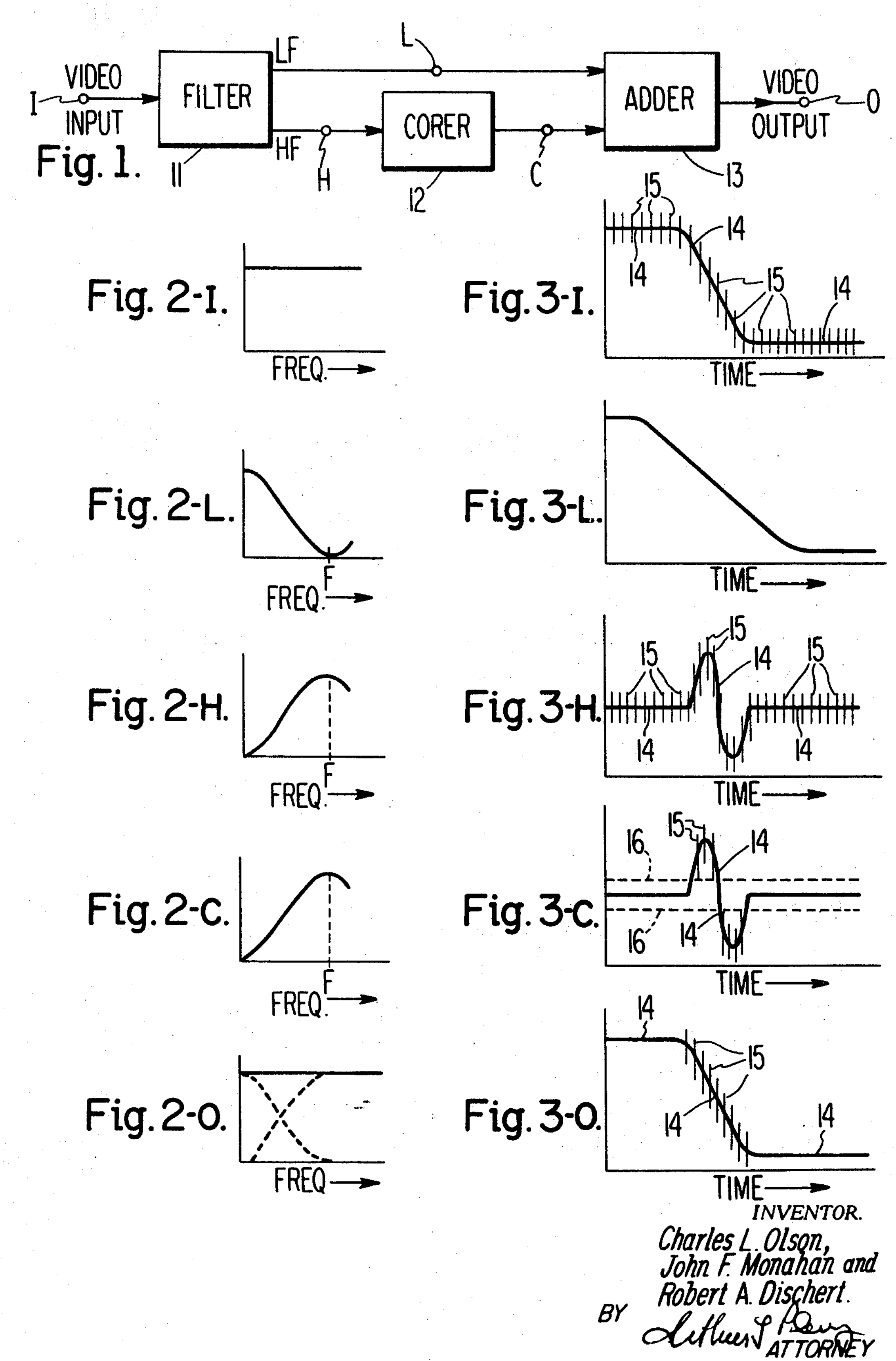
Fig. 1. Fig. 2-I. Fig. 2-L. Fig. 2-H. Fig. 2-C. Fig. 2-O. Fig. 3-I. Fig. 3-L. Fig. 3-H. Fig. 3-C. Fig. 3-O.
INVENTOR.
Charles L. Olson,
John F. Monahan and
Robert A. Dischert.
BY [signature]
ATTORNEY INVENTOR.
Charles L. Olson,
John F. Monahan and
Robert A. Dischert.
BY [signature]
ATTORNEY INVENTOR.
Charles L. Olson,
John F. Monahan and
Robert A. Dischert.
BY
ATTORNEY

PATENTED FEB 6 1973

3,715,477

SHEET 4 OF 4

INVENTOR.
Charles L. Olson,
John F. Monahan and
Robert A. Dischert
BY
ATTORNEY

VIDEO SIGNAL NOISE-LIMITING APPARATUS

BACKGROUND OF THE INVENTION

In order to enable improved reproduction of a picture from a television signal, it is necessary that the signal be as free as possible from noise and other spurious signal effects. Relatively little can be done to prevent such spurious signals from being added to the transmitted video signal during propagation from a sending station to a receiving point. However, prior to transmission a video signal is subjected to numerous processing steps such as aperture correction, white and black level setting, gamma correction, gain control and the like. During each processing step there is a possibility that unwanted noise effects will be added to the desired video signal. In the formation of a video signal it is desirable to have the video signal-generating cameras, both live and film, functioning at optimum sensitivity. But an increase of camera sensitivity beyond a certain point usually results in the production of unwanted noise accompanying the desired increased video signal. For example, in film cameras noise effects produced by the "grain" of the film are accentuated when the camera sensitivity is increased.

SUMMARY OF THE INVENTION

In all of its forms the invention is embodied in essentially the same kind of apparatus which comprises a frequency separation filter, a corer and an adder. The video signal may be that of a black and white television system. In a color television system of noise-limited video signal may be the luminance component, one or more of the plurality of component color signals or the composite luminance and chrominance signal. As used herein the term "noise-limiting" is defined as the removal of low amplitude noise and other spurious effects from the video signals representing low detail portions of the subject. The filter separates the signal into high and low frequency constituents. The corer removes low amplitude excursions from the high frequency constituent. The adder combines the core high frequency constituent with the low frequency constituent in such proportions that the resultant signal has a better signal-to-noise ratio than that of the original video signal.

When apparatus embodying the invention is used to noise-limit video signals in a color television system, the amplitude-vs-frequency characteristic of the filter may be made to have its first null point substantially at the color subcarrier frequency. As a consequence, the coring of the high frequency signal constituent results in substantially complete suppression of noise at the color subcarrier frequency in those areas of the subject lacking in appreciable detail. Also, in a presently preferred form of the invention the constituent signal frequency separation filter is of the delay line variety which has the advantage of a linear phase characteristic.

BRIEF DESCRIPTION OF THE DRAWINGS

For a more specific disclosure of the invention reference may be had to the following description of several illustrative embodiments thereof which is given in conjunction with the accompanying drawings, of which:

FIG. 1 is a block diagram of the basic elements of the apparatus comprising the invention;

FIGS. 2–I, 2–L, 2–H, 2–C and 2–O are curves in the frequency domain representing a typical video signal at the correspondingly lettered points of FIG. 1;

FIGS. 3–I, 3–L, 3–H, 3–C and 3–O are curves in the time domain representing the typical video signal at correspondingly lettered points of FIG. 1;

DESCRIPTION OF THE INVENTION

Figure 4:
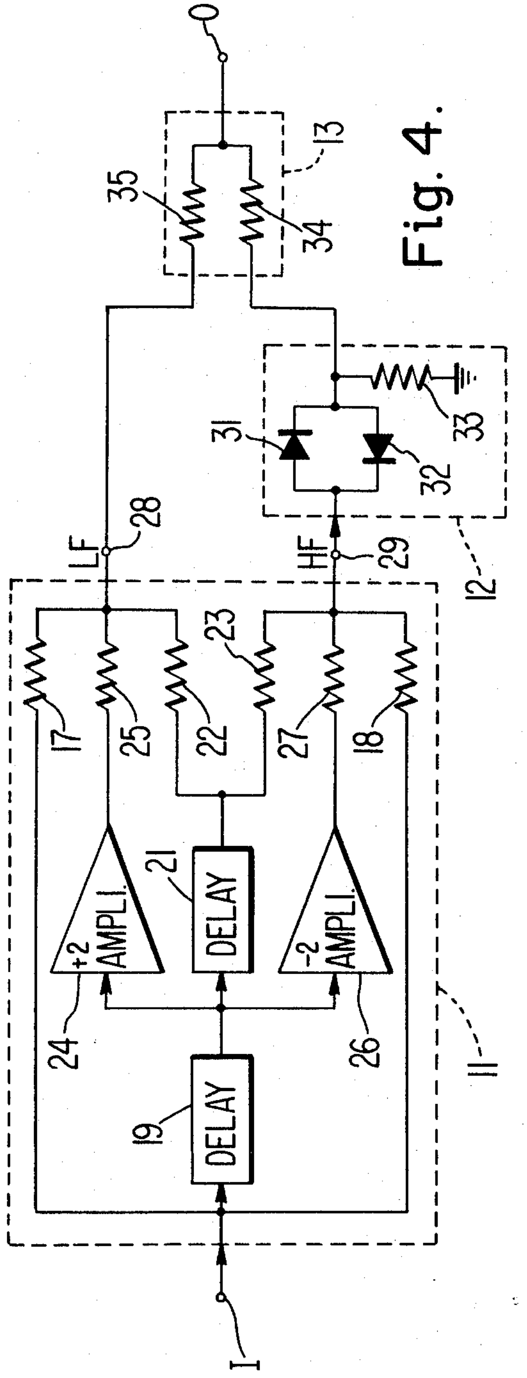
FIG. 4 is a diagram showing typical details of one form of the noise-limiting apparatus of the invention.

In FIG. 1 the video signal at input terminal point I is applied to a constituent frequency separation filter 11 which has a relatively low frequency signal constituent output LF that appears at point L. The high frequency signal constituent HF developed at point H is applied to a corer 12 having an output at point C. The unmodified low frequency signal constituent LF at point L and the cored high frequency signal constituent HF at point C are impressed upon an adder 13 in which they are combined in suitable proportions to produce a video signal with improved signal-to-noise ratio at the adder output terminal point O. The details of the filler 11, the corer 12 and the adder 13 will be disclosed subsequently, for example, in conjunction with the descriptions of FIGS. 4 and 9.

The manner in which the apparatus of FIG. 1 functions to improve the signal-to-noise ratio of the video signal is graphically illustrated in the curves of FIGS. 2 and 3.

In the frequency domain, assume that the video signal appearing at the input terminal point I has a frequency spectrum as shown by the curve of FIG. 2–I. The frequency spectrum of the relatively low frequency signal constituent LF derived from the filter 11 at point L is illustrated by the curve of FIG. 2–L. The characteristic of the filter is such that the curve of FIG. 2–L has a first null point at a frequency F. The curve of FIG. 2–H represents the frequency spectrum of the relatively high frequency signal constituent derived from the filter at point H. It should be noted that this curve has its first peak at the frequency F corresponding with that of the first null of the curve of FIG. 2–L. The frequency spectrum of the cored high frequency signal constituent produced at the output terminal point C of the corer 12 is represented by the curve of FIG. 2–C. This curve is substantially the same as that of FIG. 2–H because the portion of the signal effectively removed by the corer 12 is not evident in the frequency domain. Finally, the curve of FIG. 2–O is the combination of the curves of FIGS. 2–L and 2–C and represents the frequency spectrum of the resultant video signal derived from the adder 13 at the output terminal point O. It is seen that this resultant signal is virtually the same as the input video signal represented by the curve of FIG. 2–I.

The manner in which the apparatus of FIG. 1 improves the signal-to-noise ratio of a video signal is more strikingly shown by the curves of FIG. 3 which, in the time domain, illustrate a signal representing a relatively sharp transition between two relatively light and dark areas of a subject. It will be understood that the time scale in these figures has been grossly exaggerated for the purpose of clarity.

In the curve of FIG. 3–I, representing the amplitude of the video signal present at the input terminal point I and impressed upon the filter 11 of FIG. 1, the main subject-representative signal 14 has superimposed thereon unwanted noise and the like spurious effects 15. The curve of FIG. 3-L represents the low frequency signal constituent LF produced at the output of the filter at the point L. The curve of FIG. 3–H represents the high frequency signal constituent HF developed at the output of the filter 11 at the point H. As shown in FIG. 3–C, the corer 12 of FIG. 1 functions to remove those relatively small amplitude excursions of the main signal 14, together with the noise effects 15, that lie between the amplitudes represented by the broken lines 16. The particular manner in which this coring function is performed will be disclosed subsequently in connection with the descriptions of FIGS. 4 and 9.

Thus, the cored high frequency signal constituent represented by the curve of FIG. 3–C and produced at the point C of FIG. 1 has substantially all of the noise effects removed by the corer 12. The noise effects 15, therefore, are present in the cored signal only in the portions thereof representing the relatively sharp transitions between light and dark areas of the subject. The combination in suitable proportions of the low and high frequency signal constituents LF and HF in the adder 13 of FIG. 1 produces a resultant signal at the output terminal point O as represented by the curve of FIG. 3–O. In this curve it is seen that the noise effects 15 have been substantially removed from all portions of the main signal 14 except that part thereof representing the light-to-dark transition.

In FIG. 4, representative details of one form of the noise-limiting apparatus of FIG. 1 are shown to enable a description of the operation of such apparatus. Assume that the signal impressed at the input terminal point I consists of three equal units. A first signal unit is impressed upon signal-combining resistors 17 and 18 substantially unmodified in time and amplitude. A second signal unit is forwarded through two identical delay lines 19 and 21 and is impressed upon signal-combining resistors 22 and 23 unchanged in amplitude but delayed for a period equal to that corresponding to the frequency F of FIGURES 2–L, 2–H and 2–C. A third signal unit is delayed by the delay line 19 for a period corresponding to twice the frequency F, is doubled in amplitude by an amplifier 24, and is impressed upon a signal-combining resistor 25. The third signal unit, after its delay by the delay line 19, also is doubled in amplitude and reversed in phase by an amplifier 26 and is impressed upon a signal-combining resistor 27.

The signal developed at the filter output terminal 28 by the combination of the input signal units impressed upon the resistors 17, 22 and 25 is the low frequency constituent LF of the input signal such as that indicated in FIG. 3–L. The signal developed at the filter output terminal 29 by the combination of the input signal units impressed upon the resistors 18, 23 and 27 is the high frequency constituent HF of the input signal such as that indicated in FIG. 3–H.

The high frequency signal constituent HF developed at the filter output terminal 29 is impressed upon the corer 12, a simple form of which includes a pair of diodes 31 and 32 coupled in opposite polarity to the filter terminal 29. A cored high frequency signal constituent, having the general form of the signal shown in FIG. 3–C, is produced across a corer load resistor 33.

The cored high frequency signal constituent is impressed upon a signal-combining resistor 34 of the adder 13. The low frequency signal constituent at the terminal 28 of the filter 11 is impressed upon another signal-combining resistor 35 of the adder 13. The connection of the adder resistors 34 and 35 to the output terminal point O results in the development at this point of a noise-limited output video signal such as that indicated in FIG. 3–O.

Figure 5:
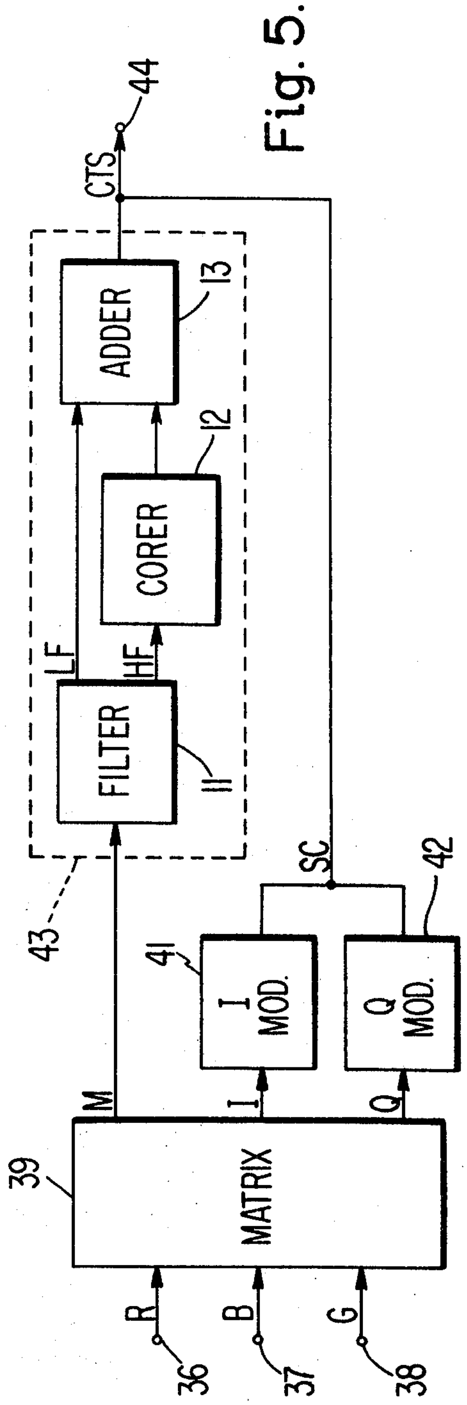
FIG. 5 is a block diagram of the apparatus embodying the invention as used to noise-limit the luminance component of a color television signal.

In a color television system there are several ways in which the noise-limiting apparatus of this invention may be employed to improve the signal-to-noise ratio of a video signal. One of these ways is indicated in FIG. 5. The red, blue and green component color signals R, B and G, respectively, derived from a signal source (not shown) such as a live or a film camera, for example, and present at input terminals 36, 37 and 38 are applied to a matrix 39 of known configuration. The matrix produces a luminance (i.e., brightness-representative) signal M and two color-representative signals I and Q. The I and Q signals are amplitude-modulated in a known manner upon two phases of a color subcarrier wave by I and Q modulators 41 and 42, respectively, to produce a phase- and amplitude-modulated subcarrier chrominance signal SC.

The luminance signal M is impressed upon the noise-limiting apparatus 43 embodying the invention. This apparatus comprises the same type of elements as that of FIG. 1 including a low and high frequency signal constituent separation filter 11, a corer 12 and an adder 13. The parameters of the filter are such that the frequency F (see FIGS. 2–L and 2–H), at which the first null and peak points of the output signals derived therefrom occur, is that of the approximately 3.58 MHz color subcarrier. The noise-limiting apparatus 43 functions similarly to that of FIG. 4 to effectively remove low amplitude excursions from the relatively low frequency portion of the high frequency constituent of the luminance signal M. The noise-limited luminance signal is then combined with the chrominance signal SC to form a composite color television signal CTS at the output terminal 44.

According to the standards set by the Federal Communications Commission for color television in the United States the luminance signal M is made up of approximately 60 parts of the green component color signal G, 30 parts of the red component color signal R and 10 parts of the blue component color signal B. Should it be necessary to adjust the coring to approximately 10 percent in order to effect a desired signal-to-noise improvement of the composite television signal CTS, the high frequency portion of the luminance signal representing a substantially pure blue area of the subject would be virtually deleted by the arrangement of FIG. 5.

Figure 6:
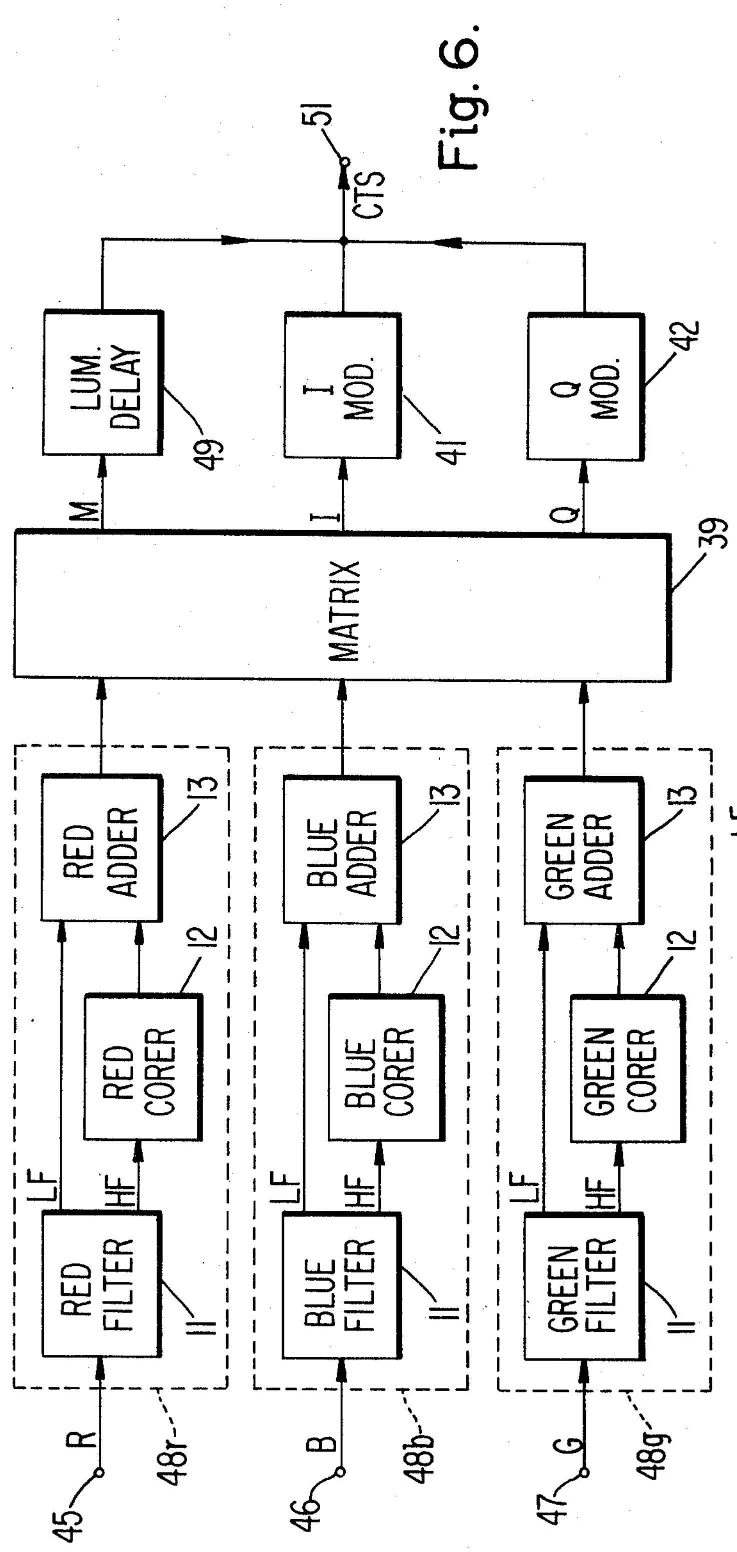
FIG. 6 is a block diagram of the noise-limiting apparatus of the invention as used to improve the signal-to-noise ratio of each of the component color signals in a color television system.

A presently preferred way of avoiding such a disadvantage of the system of FIG. 5 is indicated in FIG. 6. The red, blue and green component color signals R, B and G applied to the respective input terminals 45, 46 and 47 are impressed upon respective noise-limiting apparatus 48*r*, 48*b* and 48*g*. Each noise-limiting apparatus comprises a low and high frequency signal constituent separation filter 11, a corer 12 and an adder 13. The red, blue and green filters produce signal null and peak points at the color subcarrier frequency of approximately 3.58 MHz. The noise-limited red, blue and green component color signals derived respectively from the apparatus 48*r*, 48*b* and 48*g* are impressed upon the matrix 39 from which are derived the luminance signal M and the two color-representative signals I and Q. These signals are processed in a known manner by the modulators 41 and 42 and a luminance delay element 49 to produce the desired noise-limited composite color television signal CTS at an output terminal 51.

An important advantage of the arrangement of FIG. 6 over that of FIG. 5 is that each component color signal can be noise-limited by the apparatus of the invention without having a disproportionate effect on any component color signal. Thus, the luminance signal M will always include the proper proportions of the component color signals as specified in the U.S. standards. Also, if desired, the amount of noise-limiting of the component color signals by the apparatus of the invention can be made proportional to the noise present in the different signals. In any case, it has been found that still another way of effecting signal-to-noise-limiting in a color television system by apparatus embodying the invention is by operating upon the composite color television signal.

Figure 7:
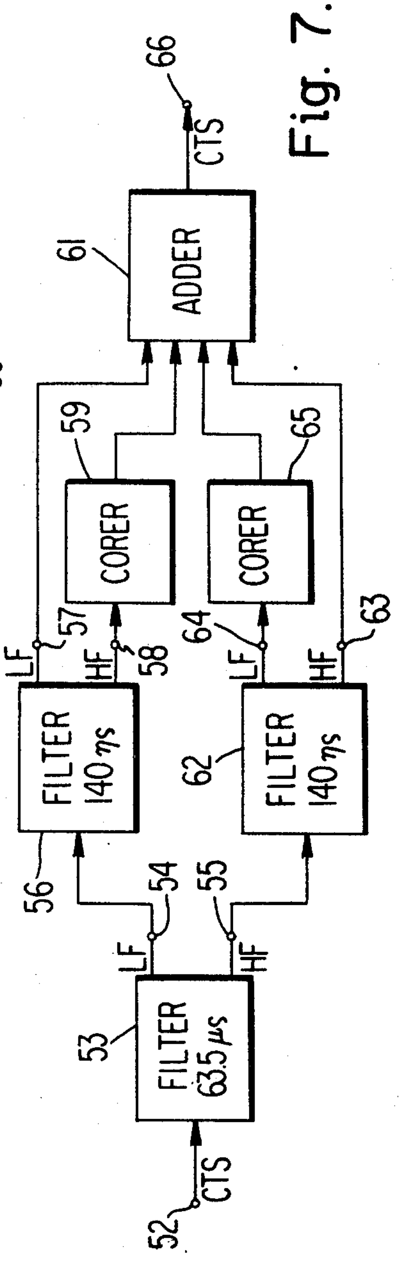
FIG. 7 is a block diagram of one way of using the noise-limiting apparatus to improve the signal-to-noise ratio of a composite color television signal.

One arrangement for doing this is indicated in FIG. 7 and it is necessarily more complex than other arrangements because the color subcarrier and its sidebands must not be disturbed. In this apparatus three signal constituent frequency separating steps are performed. In accordance with the U.S. color television standards the complete signal, present at an input terminal 52, includes an amplitude-modulated luminance component and a chrominance component comprising a phase- and amplitude-modulated subcarrier and its sidebands. This signal is impressed upon a first signal constituent frequency separation filter 53 which may be of the comb variety similar to the filter 11 of FIG. 4. In the present case each of the delay lines (not shown), corresponding to the delay lines 19 and 21 of FIG. 4, effects a delay of approximately one horizontal line period which, in the standard U.S. system, is substantially 63.5 microseconds. The relatively low frequency constituent LF of the composite color television signal at the input terminal 52 that is developed at an output terminal 54 of the filter 53 includes substantially all of the brightness (but substantially no color) information of the subject. It will be referred to as the brightness constituent of the composite color television signal. The relatively high frequency constituent HF of the composite signal that is developed at an output terminal 55 of the filter 53 includes substantially all of the color (but substantially no brightness) information of the subject. It will be referred to as the color constituent of the composite signal. Both of the brightness and color constituents at the output terminals 54 and 55 of the filter 53 include information representing the relatively sharp transitions between light and dark areas of the subject.

The brightness constituent signal at the terminal 54 is impressed upon a second constituent frequency separation filter 56 which may have the same configuration as that of the filter 11 of FIG. 4, differing only in that each of the delay lines, corresponding to the delay lines 19 and 21 of FIG. 4, effects a signal delay of 140 nanoseconds which is substantially one-half the period of a color subcarrier wave having a frequency of approximately 3.58 MHz. The low frequency portion of the signal developed at an output terminal 57 of the filter 56 has all of the brightness (but not color) information of the subject. The high frequency signal portion developed at an output terminal 58 of the filter 56 has neither brightness nor color information of the subject and consists essentially of information relating to transitions between light and dark areas of the subject.

The high frequency signal portion of the brightness constituent of the composite color television signal which is derived from the output terminal 58 of the filter 56 is impressed upon a corer 59 which may be of the type shown in FIG. 4 or that to be subsequently disclosed with reference to FIG. 9. The corer 59 functions similarly to the corer 12 of FIG. 4 to remove the noise effects from the relatively low frequency regions of the high frequency signal portion of the brightness constituent substantially as illustrated in FIG. 3–C. The cored high frequency signal portion and the low frequency signal portion of the brightness constituent of the composite color television signal are combined with one another in an adder 61.

The color constituent signal at terminal 55 of the filter 53 is separated into its relatively low and high frequency portions by a third constituent frequency separation filter 62 which may be identical with the filter 56. In this case the high frequency signal portion developed at filter output terminal 63 contains all of the color information of the subject. The low frequency signal portion of the color constituent signal developed at a filter output terminal 64 contains no brightness or color information of the subject. It is cored by a corer 65 which may be identical to the corer 59 to remove the noise effects from its relatively low frequency regions. The cored low frequency signal portion and the high frequency signal portion of the color constituent of the composite color television signal are combined with one another in the adder 61. These signal portions are also combined in the adder 61 with the previously described signal portions derived from the filter 56 and the adder 59 to produce a complete composite color television signal at an output terminal 66. By virtue of the described coring of only those signal portions containing neither brightness nor color information of the subject it is seen that this apparatus does not disturb the brightness and color representative signals. The composite signal produced at the output terminal 66 may be made to have a substantially 6 decibel improvement in signal-to-noise ratio over that of the composite signal at the input terminal 52.

Figure 8:
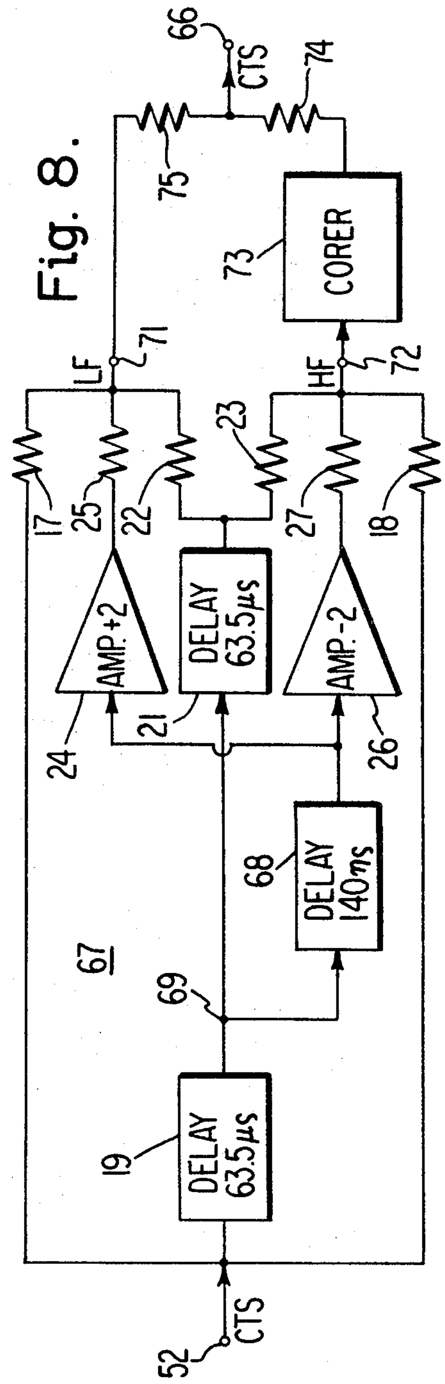
FIG. 8 is a diagram of another way of using the noise-limiting apparatus of the invention to improve the signal-to-noise ratio of a composite color television signal.

Another way of employing the noise-limiting apparatus of the invention to improve the signal-to-noise ratio of a composite color television signal is shown in FIG. 8. This apparatus uses fewer elements than the apparatus of FIG. 7. A single constituent frequency separation filter 67 is used to perform all of the functions of the three filters 53, 56 and 62 of FIG. 7. The filter 67 has the same general configuration, and includes all of the elements, of the filter 11 of FIG. 4. Such elements are identified by the same reference characters in the respective figures. In this case each of the delay lines, corresponding to the lines 19 and 21, effects a delay of 63.5 microseconds. The filter 67 employs an additional delay line 68 connecting the junction point 69 between the delay lines 19 and 21 to the amplifiers 24 and 25. The delay line 68 effects a delay of 140 nanoseconds in the signals transmitted thereby.

The signal LF produced at the output terminal 71 of the filter 67 is the relatively low frequency constituent of the composite color television signal and contains all of the brightness and all of the color information of the subject. The signal HF produced at the filter output terminal 72 is the relatively high frequency constituent of the composite color television signal and contains no brightness or color information of the subject. This latter signal is cored by a corer 73 to produce at its output a noise-limited signal constituent such as that generally indicated by the curve of FIG. 3–C. The cored, noise-limited HF signal and the LF signal are combined by resistors 74 and 75 to produce a noise-limited composite color television signal CTS at the output terminal 68.

Figure 9:
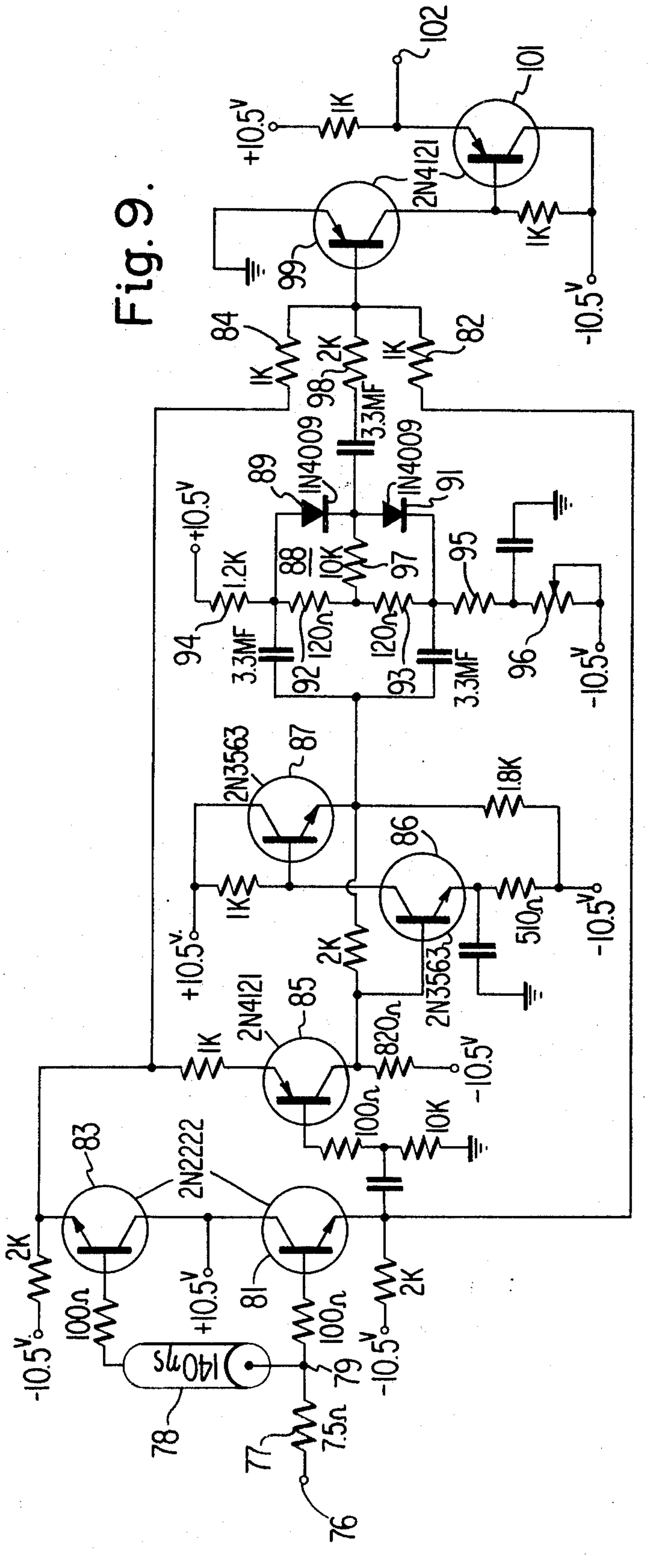
FIG. 9 is a schematic circuit diagram of the noise-limiting apparatus of the invention as used in equipment to improve the signal-to-noise ratio of each of a plurality of component color signals in a color television system.

Before describing the noise-limiting apparatus of FIG. 9 it is believed that a better understanding of such apparatus may be had by first making a closer examination of the apparatus of FIG. 4. In that figure it is seen that each of the low and high frequency signal constituents LF and HF at output terminals 28 and 29 consists of three units. First units of each constituent are developed respectively across resistors 17 and 18 by undelayed and unamplified parts of the video signal at the input terminal I. Second units of each constituent are developed respectively across resistors 22 and 23 by twice delayed and unamplified parts of the input signal. Therefore, since the same first and second signal units are developed across the resistors 17, 18, 22 and 23 for the respective low and high frequency signal constituents LF and HF, these resistors can be replaced effectively by a single resistor. A third unit of the low frequency signal constituent LF is developed across resistor 25 by a once delayed and two times amplified part of the input signal. A third unit of the high frequency signal constituent HF is developed across the resistor 27 by a once delayed, two times amplified and phase reversed part of the input signal. Thus, the low and high frequency signal constituents LF and HF at the terminals 28 and 29 respectively differ only in the polarity of their respective third units developed across the resistors 25 and 27. In the apparatus of FIG. 9 to be described presently advantage is taken of the similarity of function of some of the signal-combining resistors of the FIG. 4 apparatus so as to materially reduce the number of such resistors.

The apparatus of FIG. 9 performs all of the function of one of the noise-limiting apparatus 48 of FIG. 6. The constituent signal frequency separation filter in FIG. 9 is of the same comb type as the filter 11 of FIG. 4, differing only in configuration detail and having a specific signal delay time. The component color video signal present at an input terminal 76 is impressed through a resistor 77 upon the input end of a delay line 78 which effects a time delay of 140 nanoseconds. The delay line is terminated at its input end in its characteristic impedance by the resistor 77 and is unterminated at its output end. The input signal is divided at the junction point 79 of the delay line 78 and the resistor 77 so that one part of the input signal is applied to the delay line and another part to the base electrode of a transistor 81 connected as an emitter follower. The ensuing description will use the same terminology as that employed in the immediately preceding description of FIG. 4. It should be pointed out that the apparatus of FIG. 9 does not have any amplifiers that correspond to the amplitude-doubling amplifiers 24 and 26 of the FIG. 4 apparatus. Hence, in order that the low and high frequency signal constituents produced by the FIG. 9 apparatus be comparable in amplitude to those produced by the FIG. 4 apparatus it will be assumed that the signal at the input terminal 76 has double unity amplitude.

The delay line 78 appears to the signal at the junction point 79 as a relatively low impedance and the base electrode circuit of the transistor 81 appears as a relatively high impedance. That part of the signal at the junction point 79 that is transmitted to the unterminated end of the delay line 78 at double unity amplitude is reflected back to the base electrode of the transistor 81 where it is combined with the signal part that is applied directly to the base electrode. Assuming that the relatively high impedance of the base electrode circuit of the transistor 81 effectively reduces both of the original and reflected signal parts to unity amplitude there, thus, is impressed upon the base electrode of this transistor a first signal segment which is undelayed and of unity amplitude and a superimposed second signal segment of unity amplitude which is delayed relative to the first segment by 280 nanoseconds. These first and second signal segments constitute the first and second unit-producing signals of both low and high frequency signal constituents. They are forwarded from the emitter electrode of the transistor 81 to a signal-combining resistor 82 which, thus, is the equivalent of resistors 17 and 18 of FIG. 4.

The input signal segment that is transmitted at its original double unity amplitude to the unterminated end of the delay line 78, and not reflected back, is impressed upon the base electrode of a transistor 83 connected as an emitter follower. The signal segment that is derived from the emitter electrode of this transistor is impressed upon a signal-combining resistor 84 with double unity amplitude and a delay of 140 nanoseconds. It constitutes the third unit-producing signal of the low frequency signal constituent. The resistor 84, thus, is the equivalent of the resistor 25 of FIG. 4. Even though the resulting combination of the signals applied to the resistors 82 and 84 is not separately produced as in FIG. 4 it, nevertheless, comprises the low frequency constituent of the signal impressed upon the input terminal 76.

The combined first and second unit-producing signals derived from the emitter electrode of the transistor 81 are also applied to the base electrode of a differential amplifier transistor 85 and appear at the collector electrode of this transistor reversed in polarity and with substantially unchanged amplitude. The third unit-producing signal derived from the emitter electrode of the transistor 83 also is applied to the emitter electrode of the transistor 85 and appears at the collector electrode of this transistor substantially unchanged. These three unit-producing signals are effectively combined in the collector electrode circuit of the transistor 85 to produce the high frequency constituent of the signal impressed upon the input terminal 76. This constituent has the general form of the curve of FIg. 3–H but is of opposite phase.

The high frequency constituent of the input signal produced at the collector electrode of the amplifier transistor 85 not only is of opposite phase of the curve of FIG. 3–H but also is of insufficient amplitude for combination, after coring, with the low frequency constituent. Accordingly, it is impressed upon the base electrode of an amplifier transistor 86 which is connected in a feedback pair configuration with another transistor 87. The high frequency constituent impressed upon the base electrode of the transistor 87 from the collector electrode of the transistor 86 is of the correct phase for combination with the low frequency constituent. The high frequency constituent derived from the emitter electrode of the transistor 87 has both the proper phase and amplitude for combination with the low frequency constituent.

Before such eventual combination, however, the high frequency constituent derived from the emitter electrode of the amplifier transistor 87 is impressed upon a corer 88. The corer includes a pair of diodes 89 and 91 and a biasing network therefor which includes resistors 92 and 93. Current for the biasing network is supplied through fixed resistors 94 and 95 and a variable resistor 96. Adjustment of the variable resistor 96 effectively determines the positions of the lines 16 (FIG. 3–C) relative to the signal, thereby controlling the magnitude of the coring operation.

The cored high frequency constituent that is derived from a load resistor 97 of the corer 88 is impressed upon a signal-combining resistor 98. In view of the previously described development of the low frequency signal constituent by the interconnection of the signal-combining resistors 82 and 84, the additional connection of the resistor 98 thereto results in the production at their common terminal of a complete component color signal of which the high frequency constituent has been cored for the removal of noise effects. The resistor 98, thus, generally corresponds to the signal-combining resistor 34 of FIG. 4. The cored component color video signal is impressed upon the base electrode of a transistor 99 which is part of a feedback pair of output amplifier transistors including a second transistor 101. The video signal developed at the output terminal 102, thus, is one having a significantly improved signal-to-noise ratio compared to that of the signal impressed upon the input terminal 76 of the noise-limiting apparatus of the invention shown in FIG. 9.

It is to be understood that the practice of this invention is not necessarily limited to the use of the particular apparatus elements specified in the several illustrative embodiments disclosed herein. For example, the frequency separation filters may be other than delay line types. It, however, has been found advantageous to use delay line filters because of their substantially linear phase characteristic. In a color television system the peculiar nature of the amplitude response characteristic of such a filter makes it possible to place its first null and peak points at the color subcarrier frequency. Coring of the high frequency signal constituent then results in substantially complete suppression of noise in the region of the color subcarrier frequency for those areas of the subject lacking in appreciable detail. Noise effects at frequencies close to that of the color subcarrier are beat down (i.e., heterodyned) to lower video frequencies which produce objectionable deterioration of a picture reproduced from such signals. The suppression of such noise effects by means of this invention thereby significantly reduces such beat-down noise effects which results in an impressive improvement in a picture reproduced from the noise-limited signals.

What is claimed is:

1. Video signal noise-limiting apparatus comprising:

means providing video signals;

filtering means comprising at least one comb filter for separating a video signal into its low and high frequency constituents, said comb filter producing peak and null points of said high frequency signal constituent alternately with null and peak points respectively of said low frequency signal constituent;

means for effectively removing low amplitude excursions from said high frequency signal constituent, thereby reducing noise effects in said high frequency signal constituent; and adding means for combining said noise reduced high frequency signal constituent with said low frequency signal constituent in suitable proportions to produce an output signal with an improved signal-to-noise ratio.

2. Video signal noise-limiting apparatus as defined in claim 1, wherein:

said one comb filter includes a delay line and a pair of output terminals and provides a frequency-response at each of said output terminals having peak and null points separated by a frequency corresponding to one-half the delay time of said delay line, wherein respective peak and null points at one of said pair of output terminals corresponds in frequency to respective null and peak points at the other of said pair of output terminals.

3. Video signal noise-limiting apparatus as defined in claim 2, wherein:

said video signals comprise a composite color television signal having an amplitude varying luminance component representative of the brightness of a colored subject and a phase- and amplitude-modulated color subcarrier chrominance component representative of the color of said subject, both of said luminance and chrominance components including combinations of a plurality of component color signals representative of selected colors of said subject; and at least one of said filter delay lines has a delay time equal substantially to the period corresponding to twice the frequency of said color subcarrier.

4. Video signal noise-limiting apparatus as defined in claim 3, wherein:

all of said filter delay lines have respective delay times corresponding to one-half the period of said color subcarrier.

5. Video signal noise-limiting apparatus as defined in claim 3, wherein:

at least another of said filter delay lines has a delay time equal substantially to a horizontal line period.

6. Video signal noise-limiting apparatus comprising:

means providing a composite color television signal having an amplitude varying luminance component representative of the brightness of a colored subject and a phase- and amplitude-modulated color subcarrier chrominance component representative of the color of said subject:

filter means including a first comb filter having a delay line with a delay time equal substantially to a horizontal line period, for producing said luminance component and said color subcarrier chrominance component at separate output terminals, a second comb filter having a delay line with a time delay equal substantially to one-half the period corresponding to the frequency of said color subcarrier for producing low and high frequency portions of said luminance component, a third comb filter having a delay line with a time delay equal substantially to one-half the period corresponding to the frequency of said color subcarrier for producing low and high frequency portions of said color subcarrier chrominance component;

a first means for removing low amplitude excursions from said high frequency portions of said luminance component thereby providing a first noise reduced signal and a second means for removing low amplitude excursions from said low frequency portions of said color subcarrier chrominance component thereby providing a second noise reduced signal; and adding means combining said first and said second noise reduced signals with said low frequency portion of said luminance component and said high frequency portion of said color subcarrier chrominance component to form a single combined output signal.

7. Video signal noise-limiting apparatus comprising:

a source of composite color television signals having an amplitude varying luminance component representative of the brightness of a colored subject and a a phase-and amplitude-modulated color subcarrier chrominance component representative of the color of said subject;

a comb filter having first and second delay lines each with a delay time equal substantially to a horizontal line period and a third delay line with a delay time equal substantially to one-half the period corresponding to the frequency of said color subcarrier for producing in response to said composite signal a low frequency signal constituent having all of the brightness and color information of said subject and a high frequency signal constituent having only information relating to transitions between light and dark areas of said subject;

means for removing low amplitude excursions from said high frequency signal constituent supplied thereto to provide a noise-reduced high frequency signal constituent;

means for combining said noise-reduced high frequency signal constituent and said low frequency signal constituent to produce an output signal.

8. Video signal noise-limiting apparatus comprising:

means providing video signals;

filtering means for separating at least a selected one of said video signals into its low and high frequency constituents;

a delay line included in said filtering means and terminated in its characteristic impedance at its input end and unterminated at its output end;

means for removing low amplitude signal excursions from said high frequency constituent to provide a noise-reduced high frequency constituent;

adding means for combining said noise-reduced high frequency constituent with its respective low frequency constituent to provide an output signal;

a signal-forwarding transistor included in said filtering means and coupled to transmit to said adding means a first subdivision of said selected video signal unmodified in amplitude and time and a second subdivision of said selected video signal unmodified in amplitude but delayed in time for twice the delay time of said delay line and produced by reflection from the unterminated end of said delay line;

a signal-amplifying transistor included in said filtering means and coupled to transmit to said adding means a third subdivision of said selected video signal doubled in amplitude and delayed in time for the delay time of said delay line; and a differential amplifier transistor included in said filtering means and coupled to said signal-forwarding transistor and to said signal-amplifying transistor to transmit to said adding means a fourth subdivision of said selected video signal doubled in amplitude and delayed in time for the delay time of said delay line.

9. Video signal noise-limiting apparatus as defined in claim 8, wherein:

said selected video signal is one of a plurality of component color signals in a television system employing a color subcarrier modulated by combinations of said component color signals; and said filtering means delay line has a delay time equal substantially to one-half the period corresponding to the frequency of said color subcarrier.

10. Video signal noise-limiting apparatus as defined in claim 9, wherein:

said means for removing low amplitude signal excursions is coupled between said differential amplifier transistor and said adding means.

11. Video signal noise-limiting apparatus as defined in claim 10, wherein:

the coupling between said means for removing low amplitude signal excursions and said differential amplifier transistor includes a feedback pair of signal-amplifing transistors.

12. Video signal noise-limiting apparatus as defined in claim 11, wherein:

each of the low and high frequency constituents of said selected video signal comprise first, second and third units; and said adding means includes, a first resistor to receive said first and second subdivisions of said selected video signal to produce said first and second units of said low and high frequency signal constituents, a second resistor to receive said third video signal subdivision to produce said third unit of said low frequency signal constituent, and a third resistor to receive said fourth video signal subdivision to produce said third unit of said high frequency signal constituent.

13. Video signal noise-limiting apparatus comprising:

means providing a plurality of video signals, each representative of a different color of light in a television scene;

filtering means for separating each of said video signals into low and high frequency constituents;

said filtering means comprising at least one comb filter for each of said color representative video signals, producing peak and null points of said high frequency signal constituents alternately with null and peak points respectively of said low frequency signal constituents;

means for removing low amplitude signal excursions from each of said high frequency signal constituents to provide noise-reduced high frequency signal constituents; and adding means for recombining each of said noise-reduced high frequency signal constituents with its respective low frequency signal constituent to produce respective color representative output signals.

* * * * *